United States Patent [19]

Williams

[11] Patent Number: 4,609,859
[45] Date of Patent: Sep. 2, 1986

[54] INDUCTION MOTOR DRIVE CIRCUITS

[76] Inventor: Barry W. Williams, 108 Princes Gardens, West Acton, London, England

[21] Appl. No.: 673,891

[22] Filed: Nov. 21, 1984

[30] Foreign Application Priority Data

Dec. 1, 1983 [GB] United Kingdom ............... 8332144

[51] Int. Cl.$^4$ ............................................. H02P 5/40
[52] U.S. Cl. ................................. 318/810; 318/701
[58] Field of Search ........ 318/701, 138, 254, 807–811

[56] References Cited

U.S. PATENT DOCUMENTS

| | | | |
|---|---|---|---|
| 3,560,817 | 2/1971 | Amato | 318/138 |
| 3,560,818 | 2/1971 | Amato | 318/138 |
| 3,679,953 | 7/1972 | Bedford | 318/701 |
| 3,838,322 | 9/1974 | Greenwell | 318/138 |
| 4,253,053 | 2/1981 | Ray et al. | 318/701 |

OTHER PUBLICATIONS

Davis et al, "Inverter Drive for Switched Reluctance Motor and Component Ratings", I.E.E. Proc., vol. 128, pt. B, No. 2, Mar. 1981.

*Primary Examiner*—David Smith, Jr.
*Attorney, Agent, or Firm*—Young & Thompson

[57] ABSTRACT

The drive circuit has a pair of windings associated with each phase of the motor, with the windings of each pair being connected in antiphase. The circuit comprises a d.c. supply, respective semiconductor switches in series with each motor winding for supplying current from the supply to the associated winding in only one direction, and frequency control circuitry for switching the switches on and off so as to cause the windings of each winding pair to conduct current alternately and in opposite directions at a frequency which may be varied so as to vary the speed of the motor. In this arrangement there is no possibility of a short circuit path occurring which does not incorporate one of the motor windings, so that the rate of rise of fault current is finite and overcurrent detection circuitry can be used to turn off the switches or operate a crowbar.

11 Claims, 6 Drawing Figures

INDUCTION MOTOR DRIVE CIRCUITS

BACKGROUND OF THE INVENTION

This invention relates to drive circuits for induction motors, such as squirrel cage induction motors (SCIM) or wound rotor induction motors.

Conventional squirrel cage induction motors operate from three-phase($3\phi$), 50 Hz, 415 V mains. The motor shaft speed is virtually constant under normal operating conditions, when the best power factor and efficiency are achieved. However, some motor applications, such as in steel rolling mills, paper mills and the textile industry, require adjustable and controllable shaft speeds, and a variable frequency supply is needed to obtain a wide and continuous output speed variation from an induction motor. The conventional inverter bridge drive circuit shown in FIG. 1 of the accompanying drawings is used to convert d.c. voltage into variable frequency a.c. voltage for driving a SCIM incorporating three windings b, r and y. The d.c. input voltage of 600 V of the bridge is obtained by $3\phi$ rectification of the 415 V a.c. mains. The bridge output frequency is changed by varying the rate at which the six bridge switches Ta, Tb, Tc, Td, Te and Tf are sequentially switched. In FIG. 1 the switches are shown as bipolar transistors, but they can alternatively be conventional thyristors, gate turn-off thyristors, field-effect transistors and the like. The circuit also includes six diodes Da, Db, Dc, Dd, De and Df.

The major drawback of the voltage fed inverter drive shown in FIG. 1 is termed "shoot through". Shoot through occurs when two series switches across the 600 V d.c. rail are accidentally switched on simultaneously. This creates a catastrophic short circuit across the d.c. supply rails and usually results in device failure. Fuse protection is usually inadequate since fuses cannot respond quickly enough to prevent device failure. Drive system reliability is therefore low and this has prevented the full potential of the voltage fed inverter drive from being exploited over the past twenty five years.

SUMMARY OF THE INVENTION

According to the invention there is provided a drive circuit for an induction motor having a pair of windings associated with each phase of the motor, with the windings of each pair being connected in antiphase, the circuit comprising means for connection to a d.c. supply, respective switching means for connecting in series with each motor winding and for supplying current from the supply to the associated winding in only one direction, and frequency control means for switching the switching means on and off so as to cause the windings of each winding pair to conduct current alternately and in opposite directions at a frequency which may be varied so as to vary the speed of the motor.

In this arrangement there is no possibility of a short circuit path occurring which does not incorporate one of the motor windings, since a motor winding is disposed in series with each switching means, so that the rate of rise of fault current is finite and over-current detection circuitry can be used to turn off the switching means or operate a crowbar. In certain circumstances, fuse protection may be adequate.

In a preferred embodiment of the invention, the switching means associated with each motor winding comprises two switching elements in series with the winding, one element being coupled to each end of the winding, and the frequency control means are adapted to switch both switching elements on to supply current from the supply to the winding. Furthermore a respective freewheeling diode is preferably coupled to each end of the winding so as to provide a path for freewheeling motor current when the switching elements are switched off. The switching elements and diodes form what may be termed an "asymmetrical half bridge" arrangement, and such as arrangement is particularly advantageous for a number of reasons which are discussed below with reference to the drawings.

BRIEF DESCRIPTION OF THE DRAWINGS

In order that the invention may be more fully understood, reference will now be made to the accompanying drawings, in which.

DETAILED DESCRIPTION OF THE DRAWINGS

Figure 2:
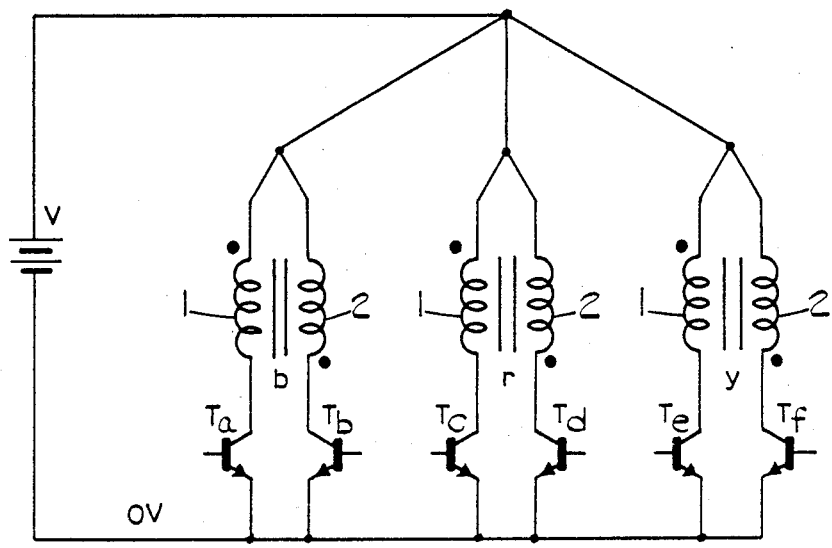
FIG. 2 is a simplified circuit diagram of an alternative prior art drive circuit.

FIG. 2 shows a unipolar SCIM drive circuit for supplying a bifilar wound SCIM, that is a motor having a total of six windings instead of the usual three, each phase being associated with a respective pair of windings wound together (a so-called "bifilar") in which the two windings are connected in antiphase and each conducts current in only one direction. In this drive circuit the first winding 1 of each bifilar pair is controlled by one series switch Ta, Tc or Te, and the second winding 2 of that pair is controlled by another series switch Tb, Td or Tf, these switches being shown as bipolar transistors in the illustrated form of this circuit.

In the prior art unipolar drive circuit of FIG. 2 there is no possible semiconductor short circuit path in which a short circuit current may flow between the supply rails without passing through one of the motor windings, so that shoot through is eliminated. Each switch can be effectively protected from overcurrent, since its load imposes a limit on di/dt during a malfunction, thereby affording adequate time for crowbar and/or fuse protection to operate. The circuit of FIG. 2 may be termed a single ended bridge (SEB) circuit.

Figure 3:
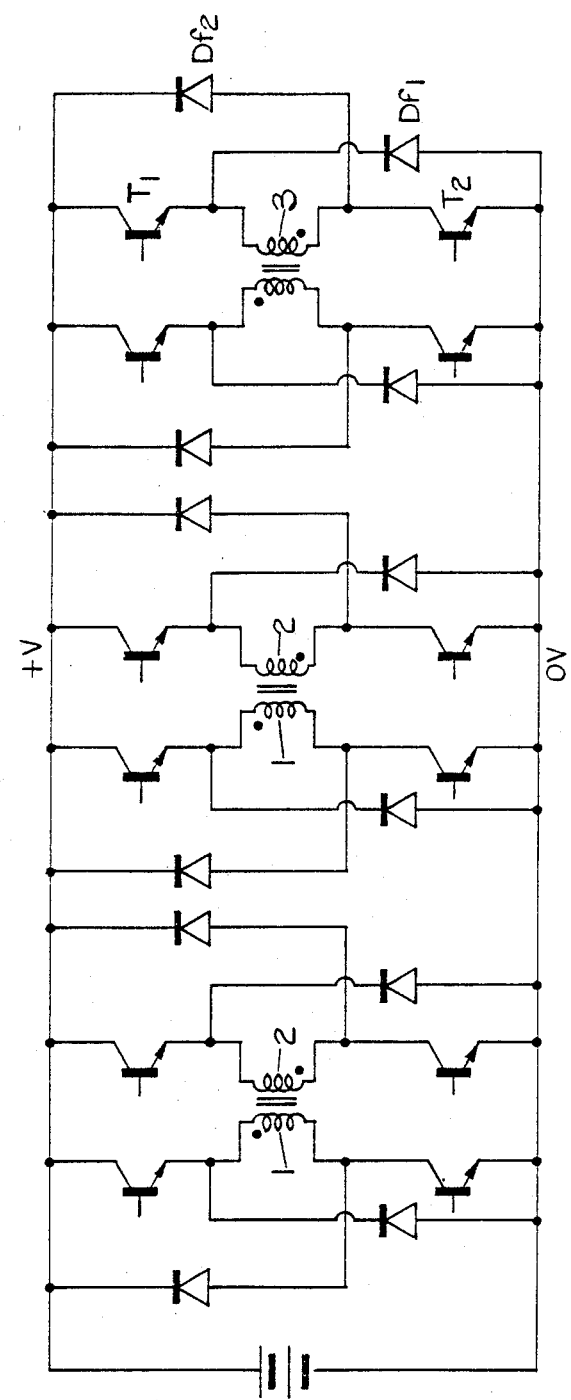
FIG. 3 is a simplified circuit diagram of a drive circuit in accordance with the invention.

FIG. 3 shows a form of unipolar SCIM drive circuit in accordance with the invention which comprises six windings 3 disposed in six asymmetrical, unipolar half bridges. Each half bridge comprises a switch T1 connected to one end of the associated motor winding 3 and a switch T2 connected to the other end of the winding 3. Supply of current to the winding 3 is obtained by simultaneous switching of the switches T1 and T2. Associated with each switch T1 or T2 is a respective freewheeling diode Df1 or Df2 the function of which will be apparent from the following description. The use of such half bridges in connection with a bifilar or unipolar wound SCIM provides a number of significant advantages which improve the commercial viability of the SCIM variable speed drive. Such an arrangement may be termed an asymmetrical half bridge (AHB) arrangement.

Figure 1:
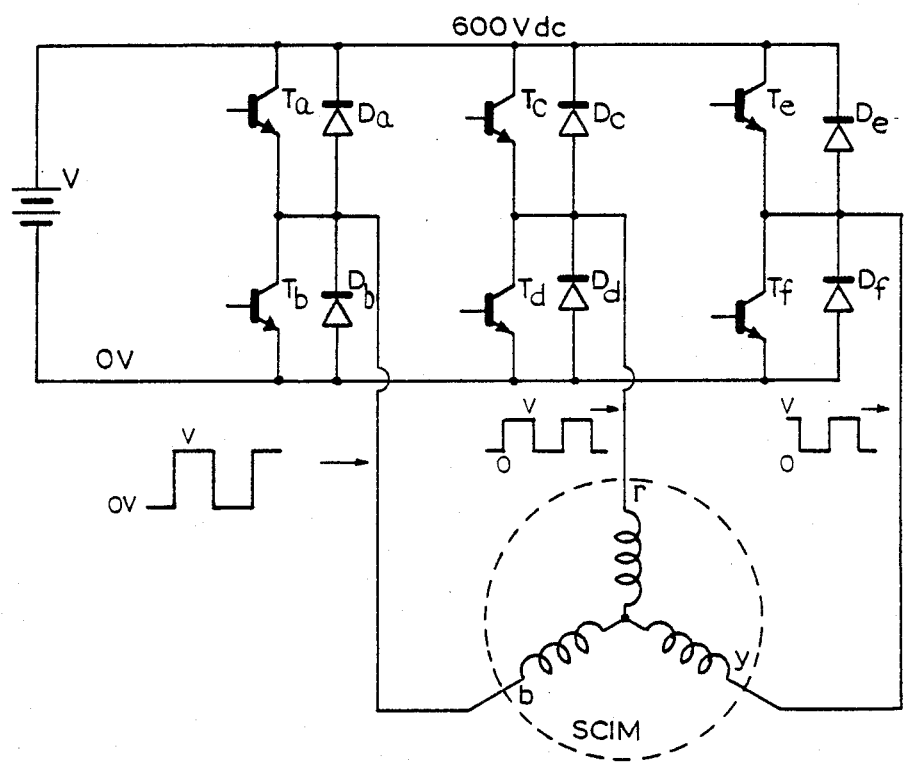
FIG. 1 is a simplified circuit diagram of a prior art drive circuit which has already been referred to above.

The AHB arrangement of FIG. 3 possesses significant advantages over the SEB arrangement of FIG. 2 and the conventional bridge of FIG. 1. The SEB arrangement utilises switching devices having voltage ratings which are twice the supply voltage, whereas the AHB arrangement uses devices having voltage ratings which are the same as the supply voltage. Thus lower voltage rating devices can be employed in the AHB, such devices being cheaper and representing better device utilisation. Current requirements for the devices are the same in each case. If the usual 600 V d.c. rail is employed, transistors can be made use of in the SEB arrangement only at the expense of increased circuit complexity and cost. It is therefore usually necessary to employ thyristors in the SEB arrangement. By contrast currently available 1000 V, 300 A transistors are eminently suitable for use in an AHB arrangement utilising a 600 V d.c. rail.

Figure 4:
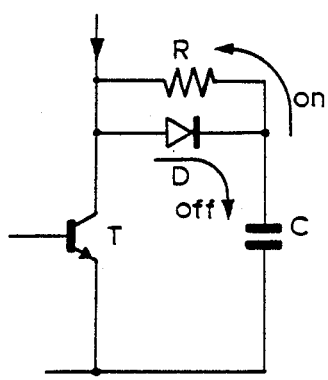
FIG. 4 is a diagram of a snubber circuit which may be used with each switching transistor of the circuit of FIG. 3.

In the above described AHB arrangement each switching transistor may be incorporated in a respective transistor turn-off snubber network of the type shown in FIG. 4. This comprises a capacitor C, a resistor R and a diode D and serves to reduce the turn-off losses of the transistor. On transistor turn-off, current is diverted from the transistor T to the capacitor C and the transistor collector voltage is clamped to the capacitor voltage. Transistor turn-off therefore occurs at a low voltage, thereby minimising the transistor turn-off losses. During this process the capacitor C charges to the voltage V of the supply rail. The capacitor stored energy is $\frac{1}{2}CV^2$. When the transistor next turns on, this capacitor energy is discharged and is dissipated as heat in the snubber resistor R. Since the switching transistors have to support twice the supply voltage in an SEB arrangement, the snubber losses in such an arrangement are four times higher than they would be in the AHB arrangement.

Figure 5:
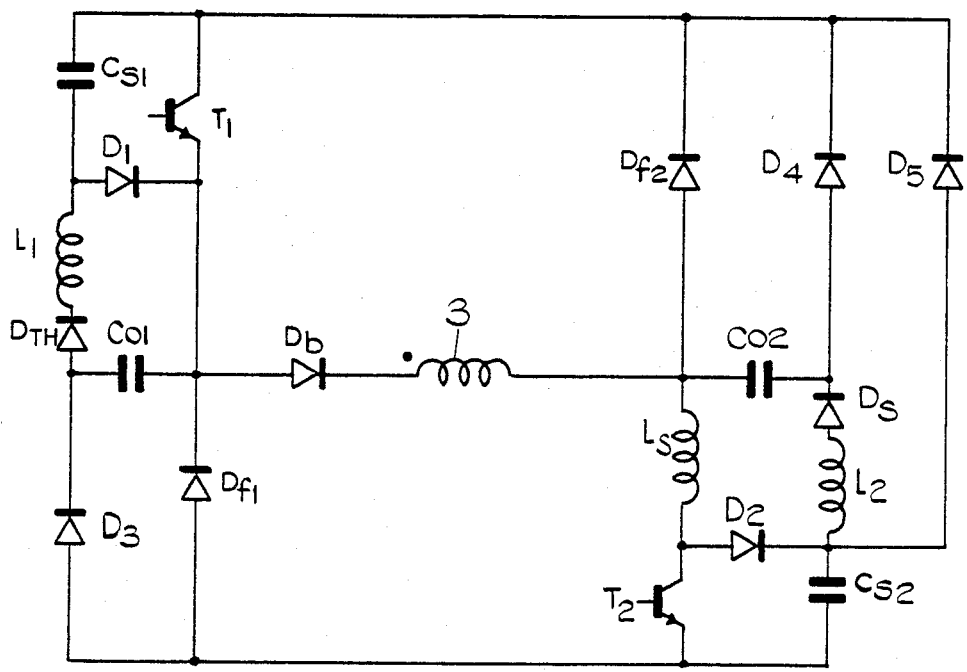
FIG. 5 is a diagram of part of a further drive circuit in accordance with the invention.

Since the AHB arrangement does not experience circuit voltages in excess of the supply rail voltage V, it is possible to design the circuit so that the snubber energy is recovered, and FIG. 5 shows a modification of the circuit of FIG. 3 in such a manner as to provide lossless snubber energy recovery, it being understood that, in order to render FIG. 5 easier to read, only that part of the circuit associated with one of the six windings 3 is shown in the figure, and that the complete circuit will additionally comprise five further similar parts connected to the other five windings in a manner which can readily be determined by referring to FIG. 3. The circuit includes two turn-off snubber networks associated with the transistors T1 and T2 respectively and having respective snubber capacitors Cs1 and Cs2, and a single turn-on snubber network incorporating an inductor ls for reducing transistor turn-on losses. This circuit recovers the stored energy in Cs1, Cs2 and ls by transferring it to the load, rather than dissipating it in resistors as is usual. Only one turn-on inductor ls is necessary since this inductor controls the current of both transistors T1 and T2 which are effectively in series. A feature of this unified energy recovery circuit is that no voltages in excess of the d.c. voltage rail are experienced.

Figure 6:
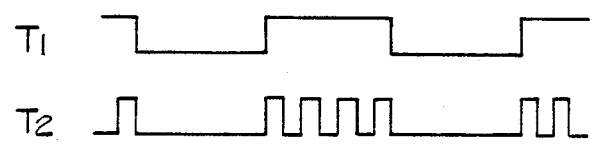
FIG. 6 shows two pulse waveforms of a pulse width modulation technique which may be used to control the circuit of FIG. 5.

The circuit of FIG. 5 is controlled by means of a novel form of pulse width modulation (PWM) according to which T1 and T2 are switched at the required supply frequency for example 50 Hz, and additionally T2 only is modulated at high frequency such that, during each period when T1 is on, T2 is switched on and off a number of times. This is shown diagrammatically in FIG. 6. Since T2 is easier and more efficient to drive than T1, switching losses in T2 are lower than would be attained if T1 were also modulated.

The manner in which this circuit operates will now be described in greater detail with reference to FIG. 5. If the case is considered first where T1 is on and T2 is being modulated, charge is transferred through the diode D2 to the capacitor Cs2 when T2 is turned off, in the same manner described with reference to FIG. 4. When T2 is subsequently turned on the stored charge is transferred from the capacitor Cs2 to a further capacitor Co2 (having a capacitance equal to that of Cs2) by way of an inductor l2, a diode Ds and ls. When T2 subsequently turns off the stored charge on Co2 is transferred to the motor winding 3 by way of a diode D4, T1 and a further optional diode Db, and simultaneously the energy in ls is also transferred to the motor winding by way of D2, D5, T1 and Db. As a consequence of only modulating T2, the load current free wheels through T1 and Df2 after Co2 and ls have released their energy, rather than back through the supply via the diodes Df1 and Df2 as would be the case if both T1 and T2 were modulated.

Considering now the case when both T1 and T2 are switched off, the snubber circuit associated with T1 comprising Cs1, D1, l1, DTH and Co1 operates in the same manner as the snubber circuit associated with T2 to transfer turn-off energy to Cs1 on T1 turn-off and to then transfer this energy to Co1 on subsequent T1 turn-on. Furthermore, on turn-off of T1, which occurs simultaneously with T2 turn-off, both Co1 and Co2 discharge their stored energy through the motor winding 3 by way of the supply and the diodes D4, D3 and Db. Simultaneously ls transfers its energy to the motor winding 3 and the supply by way of D5, D3 and Db. After the energy recovery cycle on turn-off of T1 and T2 is complete the motor current flows through the winding 3 and through the freewheeling diodes Df1 and Df2 and the further diode Db.

In the proposed pulse width modulation method the width of the pulses used to turn T2 on and off may be varied (by varying the time of occurrence of the trailing edge of the pulse for example) in order to vary the voltage supply to the motor winding 3. The proposed modulation method results in a low PWM switching rate because of the low free-wheeling loop voltages. Because of the high switching rate of T2, its associated free-wheeling diode Df2 needs to be of a fast recovery type. The associated inductance ls controls the reverse recovery of Df2 when T2 turns on. The freewheeling diode Df1 need not be of an ultra fast recovery type since its associated transistor T1 never turns on into freewheeling load current and therefore does not have to handle any diode Df1 reverse recovery.

The function of the diode Db in FIG. 5 will now be explained. During PWM the non-switched transistor snubbers undesirably discharge and subsequently recharge due to the fact that magnetic winding coupling occurs between the half bridge which is not in operation and the associated half bridge which is switching. The leakage reactance of the motor acts to control the peak current level to some extent, although extra series inductance can also be added to the load winding if desired. If this phenomenon is to be totally eliminated, two possible solutions may be employed. The first of these is to make use of the series diode Db which must be placed at the end of the motor winding 3 nearer T1 in order to ensure elimination of any charging currents caused by inter-winding capacitance. If the motor is bifilar wound the charging currents are higher than if the machine is wound with two separate coils, isolated and placed on top of one another. An arrangement in which the winding coils of associated half bridges are separate and placed on top of one another is also advantageous since it enables the machine voltage rating to be significantly increased in view of the fact that there are no longer two wires immediately next to one another which differ in voltage by 2 V.

The second possible solution, which is applicable if the inter-winding capacitance is low, is to replace the diode DTH by a low-current thyristor of voltage rating V. This thyristor may then be controlled by means of its gate in such a manner as to eliminate undesirable discharge and recharging of the non-switched transistor snubbers. This solution is less expensive and introduces less losses than the provision of the diode Db.

The above described AHB arrangements may also be modified to drive a two-phase SCIM in which case only four asymmetrical half bridges are required and the cost of the drive circuit is accordingly reduced as compared with that required for driving a three-phase SCIM.

The above described bifilar configuration technique and AHB arrangements may also be made use of in the drive circuit of a synchronous machine in place of the normal inverter bridge, in order to allow a wide range of speed variation.

I claim:

1. A drive circuit for an induction motor having a pair of windings associated with each phase of the motor, with the windings of each pair being connected in antiphase, the circuit comprising supply means for connection to a d.c. supply, respective switching means associated with each motor winding for supplying current from the supply to the associated winding in only one direction, and frequency control means for switching the switching means on and off so as to cause the windings of each winding pair to conduct current alternately and in opposite directions at a frequency which may be varied so as to vary the speed of the motor, wherein the switching means associated with each motor winding incorporates a switching element and a free-wheeling diode connected in series across the supply means and adapted for connection to the associated winding at their common connection point, whereby the freewheeling diode provides a path for freewheeling motor current when the associated switching element is switched off.

2. A drive circuit according to claim 1, wherein the switching means associated with each motor winding comprises two switching elements for connection in series with the winding such that one element is coupled to each end of the winding, the frequency control means being adapted to switch both switching elements on to supply current from the supply to the winding.

3. A drive circuit according to claim 1, wherein a respective freewheeling diode is coupled to each end of each winding so as to provide a path for freewheeling motor current when the associated switching means is switched off.

4. A drive circuit according to claim 1, 2 or 3, wherein each switching element is incorporated in a respective turn-off snubber network serving to reduce turn-off losses in the switching element.

5. A drive circuit according to claim 4, wherein the turn-off snubber network incorporates, in parallel with the switching element, a capacitance and a diode enabling charging of the capacitance when the switching element turns off.

6. A drive circuit according to claim 5, wherein the turn-off snubber network also incorporates a resistance for dissipating the energy stored in the capacitance when the switching element turns on.

7. A drive circuit according to claim 5, wherein the turn-off snubber network is such as to discharge the energy stored in the capacitance to the associated winding when the switching element turns on, so as to provide substantially lossless snubber energy recovery.

8. A drive circuit according to claim 7, wherein the turn-off snubber network also incorporates a further capacitance and an inductance such that the energy stored in the first-mentioned capacitance is transferred to the further capacitance by way of the inductance when the switching element turns on, whereby the energy may be discharged to the winding on subsequent turn-off of the switching element.

9. A drive circuit according to any preceding claim, wherein each switching element is incorporated in a respective turn-on snubber network serving to reduce turn-on losses in the switching element.

10. A drive circuit according to claim 9, wherein the turn-on snubber network incorporates an inductance in series with the switching element.

11. A drive circuit according to claim 2, further comprising pulse width modulation circuitry for controlling switching of the switching means such that one switching element of each switching means is modulated at high frequency such that, during each period when the other switching element of the switching means is on, the one switching element is switched on and off a plurality of times.

* * * * *